United States Patent
Acevedo et al.

(10) Patent No.: US 11,315,226 B2
(45) Date of Patent: Apr. 26, 2022

(54) INTELLIGENT CABLING AND CONNECTION VALIDATION

(71) Applicant: International Business Machines Corporation, Armonk, NY (US)

(72) Inventors: Paulina Acevedo, Tucson, AZ (US); Veronica A. Reeves-Voeltner, Tucson, AZ (US); Samantha A. Utter, Tucson, AZ (US); Beth A. Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 16/550,326

(22) Filed: Aug. 26, 2019

(65) Prior Publication Data

US 2021/0065348 A1 Mar. 4, 2021

(51) Int. Cl.
*G06K 9/00* (2022.01)
*G06T 7/00* (2017.01)
*G06T 7/70* (2017.01)
*G06F 30/00* (2020.01)
*G06V 10/10* (2022.01)
*G06F 111/20* (2020.01)
*G06F 113/16* (2020.01)

(52) U.S. Cl.
CPC ............ *G06T 7/0002* (2013.01); *G06F 30/00* (2020.01); *G06T 7/70* (2017.01); *G06T 7/97* (2017.01); *G06V 10/10* (2022.01); *G06F 2111/20* (2020.01); *G06F 2113/16* (2020.01)

(58) Field of Classification Search
CPC . G06T 7/0002; G06T 7/97; G06T 7/70; G06F 30/00; G06K 9/78

USPC .......................................................... 382/103
See application file for complete search history.

(56) References Cited

U.S. PATENT DOCUMENTS

| | | | |
|---|---|---|---|
| 7,817,583 B2 | 10/2010 | Graves | |
| 7,984,375 B1* | 7/2011 | Jaramillo | G06F 8/70 715/255 |
| 9,037,686 B2 | 5/2015 | Kugel | |
| 10,454,210 B1* | 10/2019 | Werner | G06T 19/006 |
| 2002/0147027 A1 | 10/2002 | Alford, Jr. et al. | |
| 2006/0156294 A1* | 7/2006 | Fuller, III | G06F 8/34 717/154 |
| 2014/0108000 A1 | 4/2014 | Datla et al. | |
| 2016/0299750 A1 | 10/2016 | Koniges et al. | |
| 2018/0247123 A1* | 8/2018 | Harper | H04N 5/23222 |
| 2020/0137918 A1* | 4/2020 | Takisaki | H04N 19/17 |

* cited by examiner

*Primary Examiner* — Stephen P Coleman
(74) *Attorney, Agent, or Firm* — Nelson IP; Daniel P. Nelson

(57) ABSTRACT

A method is disclosed to ensure that components in a complex system are correctly connected together. In one embodiment, such a method captures a visual image of a system made up of multiple components connected together with cables. The method analyzes the visual image to determine connections between the components. The method further builds a current model that represents the connections between the components. This current model is then compared to a previous model to find differences between the current model and the previous model. If differences exist, the method notifies a user of the differences. This may assist the user in identifying any incorrect connections between the components. A corresponding apparatus and computer program product are also disclosed.

20 Claims, 7 Drawing Sheets

INTELLIGENT CABLING AND CONNECTION VALIDATION

BACKGROUND

Field of the Invention

This invention relates to apparatus and methods for validating cabling and connections between components.

Background of the Invention

In complex rack-mounted or other systems (e.g., storage arrays, audio-visual systems, mainframe servers, etc.) that include multiple discrete electronic components that are connected to one another, the components are often connected together using external cables. These cables may be connected to ports on the components to enable communication and/or power signals to pass therebetween. The cables represent a critical part of the system infrastructure. If cables are not installed properly, the complex system is unlikely to function as well as it could, and may not function at all. For this reason, cabling systems, such as structured cabling, have been developed to minimize mistakes that may impair the operation of a complex system.

With complex systems that include a large number of components, the number of cables may be significant. Furthermore, the large number of components in such systems increases the probability that components will fail and/or need to be replaced or serviced at some point in the future. When components in a complex system are connected together with cables at the time they are initially set up or when a component is replaced, there is a significant chance that the components will be connected together incorrectly. Incorrectly connected cables are typically not easily identified and may lead to a crisis or failure at some future point-in-time. Trying to diagnose and remedy incorrectly connected cables may consume a significant amount of time and resources and therefore result in significant costs.

In view of the foregoing, what are needed are apparatus and methods to ensure that components in a complex system are correctly connected together. Ideally, such apparatus and methods will significantly reduce human error when connecting components together.

SUMMARY

The invention has been developed in response to the present state of the art and, in particular, in response to the problems and needs in the art that have not yet been fully solved by currently available apparatus and methods. Accordingly, embodiments of the invention have been developed to ensure that components in a complex system are correctly connected together. The features and advantages of the invention will become more fully apparent from the following description and appended claims, or may be learned by practice of the invention as set forth hereinafter.

Consistent with the foregoing, a method is disclosed to ensure that components in a complex system are correctly connected together. In one embodiment, such a method captures a visual image of a system made up of multiple components connected together with cables. The method analyzes the visual image to determine connections between the components. The method further builds a current model that represents the connections between the components. This current model is then compared to a previous model to find differences between the current model and the previous model. If differences exist, the method notifies a user of the differences. This may assist the user in identifying any incorrect connections between the components.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
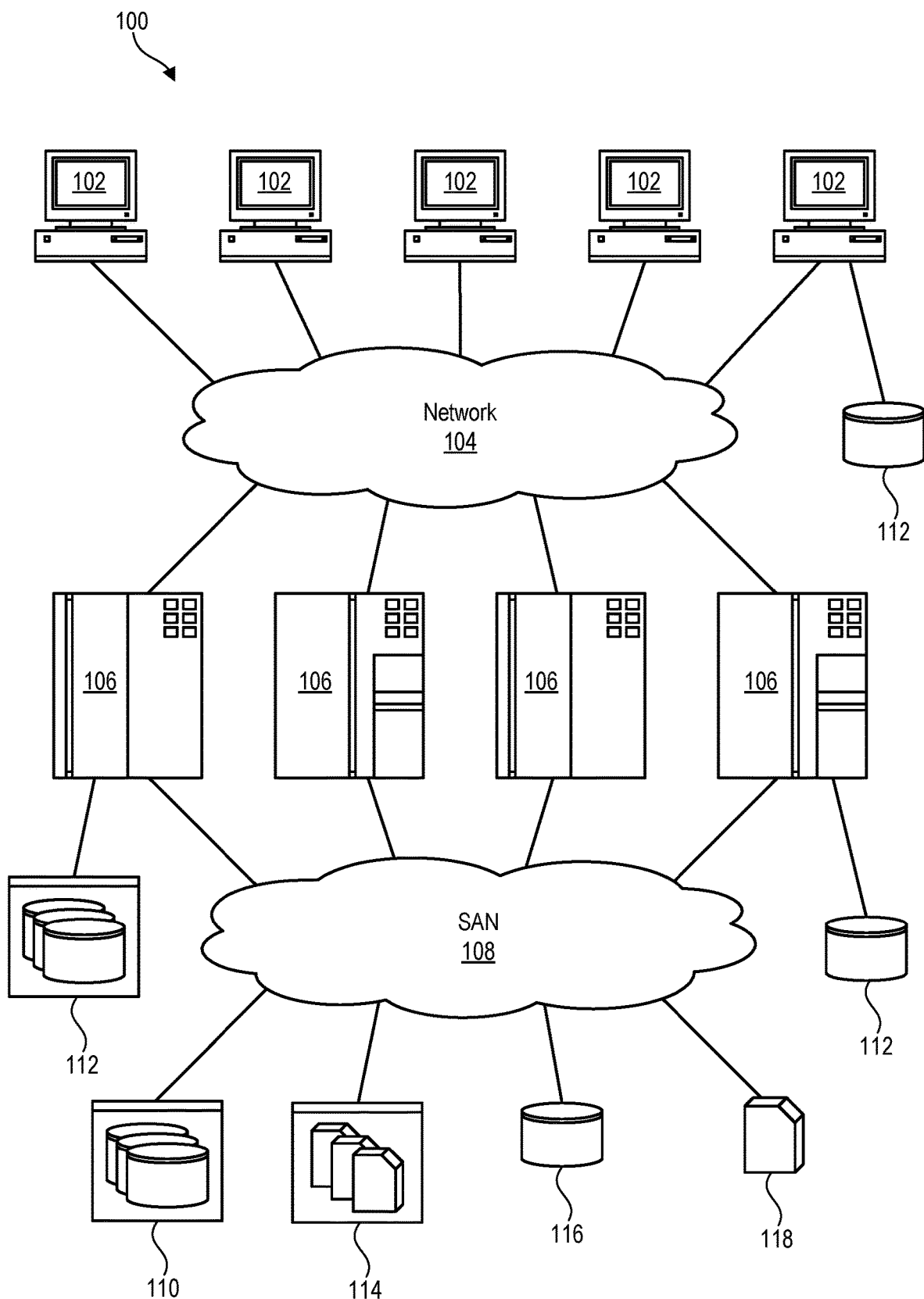
FIG. 1 is a high-level block diagram showing one example of a network environment in which apparatus and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer-readable storage medium (or media) having computer-readable program instructions thereon for causing a processor to carry out aspects of the present invention.

The computer-readable storage medium may be a tangible device that can retain and store instructions for use by an instruction execution device. The computer-readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer-readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where apparatus and methods in accordance with the invention may be utilized. The network environment 100 is presented by way of example and not limitation. Indeed, the apparatus and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as host systems 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 114, individual hard-disk drives 116 or solid-state drives 116, tape drives 118, CD-ROM libraries, or the like. To access a storage system 110, 114, 116, 118, a host system 106 may communicate over physical connections from one or more ports on the host system 106 to one or more ports on the storage system 110, 114, 116, 118. A connection may be through a switch, fabric, direct connection, or the like. In certain embodiments, the servers 106 and storage systems 110, 114, 116, 118 may communicate using a networking standard or protocol such as Fibre Channel (FC) or iSCSI.

Figure 2:
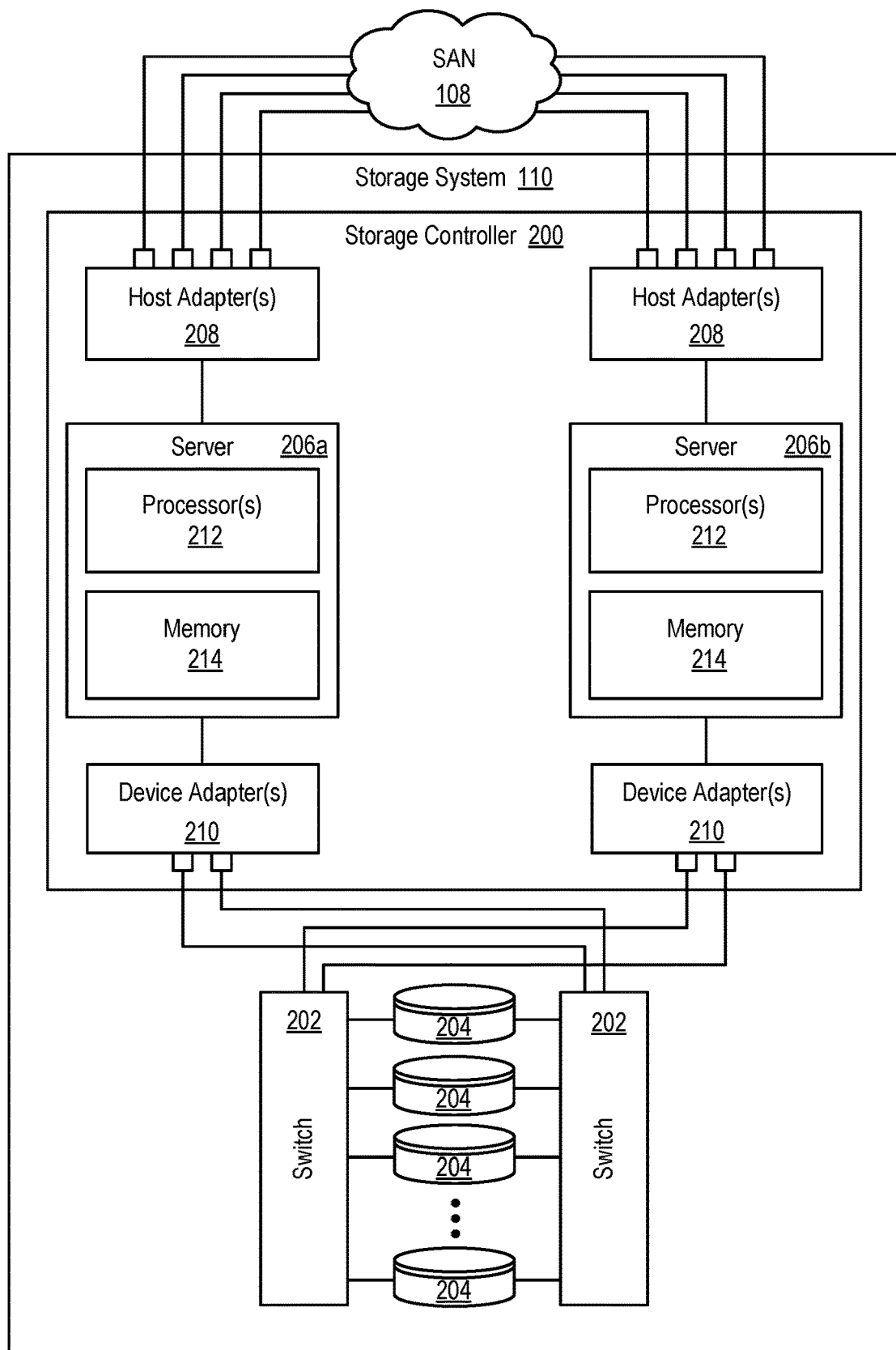
FIG. 2 is a high-level block diagram showing one embodiment of a storage system for use in the network environment of FIG. 1.

Referring to FIG. 2, one example of a storage system 110 containing an array of hard-disk drives 204 and/or solid-state drives 204 is illustrated. As shown, the storage system 110 includes a storage controller 200, one or more switches 202, and one or more storage drives 204, such as hard-disk drives 204 and/or solid-state drives 204 (e.g., flash-memory-based drives 204). The storage controller 200 may enable one or more host systems 106 (e.g., open system and/or mainframe servers 106 running operating systems such z/OS, zVM, or the like) to access data in the one or more storage drives 204.

In selected embodiments, the storage controller 200 includes one or more servers 206a, 206b. The storage controller 200 may also include host adapters 208 and device adapters 210 to connect the storage controller 200 to host devices 106 and storage drives 204, respectively. Multiple servers 206a, 206b may provide redundancy to ensure that data is always available to connected host systems 106. Thus, when one server 206a fails, the other server 206b may pick up the I/O load of the failed server 206a to ensure that I/O is able to continue between the host systems 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
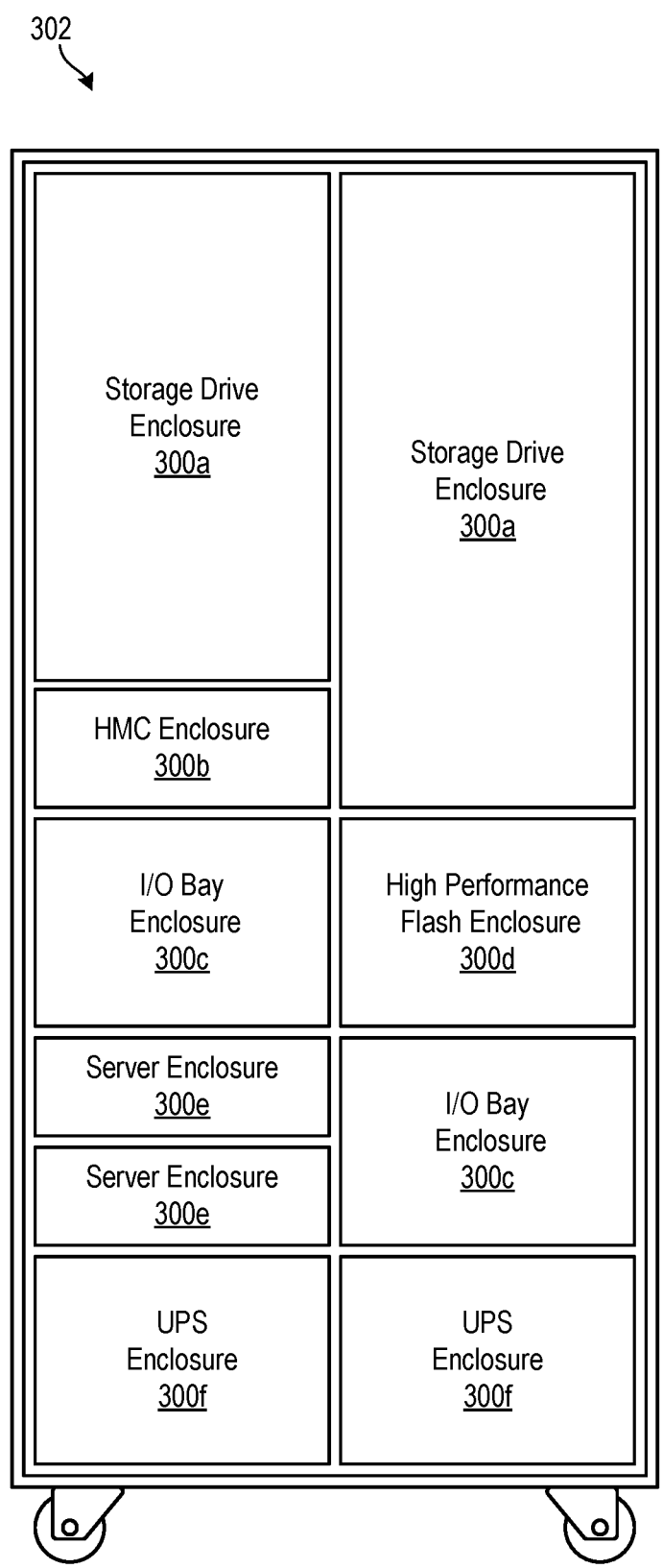
FIG. 3 is a high-level block diagram showing components of a storage system, such as the storage system illustrated in FIG. 2, contained within a rack.

Referring to FIG. 3, in certain embodiments, the components of a storage system 110, such as that illustrated in FIG. 2, may be contained in various enclosures 300 mounted, for example, within a rack 302. For example, the storage drives 204 may be contained within storage drive enclosures 300a, the host adapters 208 and/or device adapters 210 may be contained within I/O bay enclosures 300c, the servers 206a, 206b may be contained within server enclosures 300e, and so forth. In the illustrated embodiment, the rack 302 may also include an enclosure 300b that contains a hardware management console (HMC), enclosures 300f that contain uninterruptible power supplies (UPSs), and an enclosure 300d that contains high performance flash memory. These enclosures 300 are simply provided by way of example and not limitation. Other types of enclosures 300 are possible and within the scope of the invention.

In rack-mounted systems such as that illustrated in FIG. 3 that include multiple electronic components (e.g., host adapters 208, servers 206, device adapters, 210, switches 202, storage drives 204, etc.) that are connected to one another, the components may be connected together using external cables. These cables may be connected to ports on the components to enable communication and/or power signals to pass therebetween. The cables represent a critical part of the system infrastructure. If cables are not installed properly, the system is unlikely to function as well as it could, and may not function at all. For this reason, cabling systems, such as structured cabling, have been developed to minimize mistakes that may impair the operation of such a system.

Figure 4:
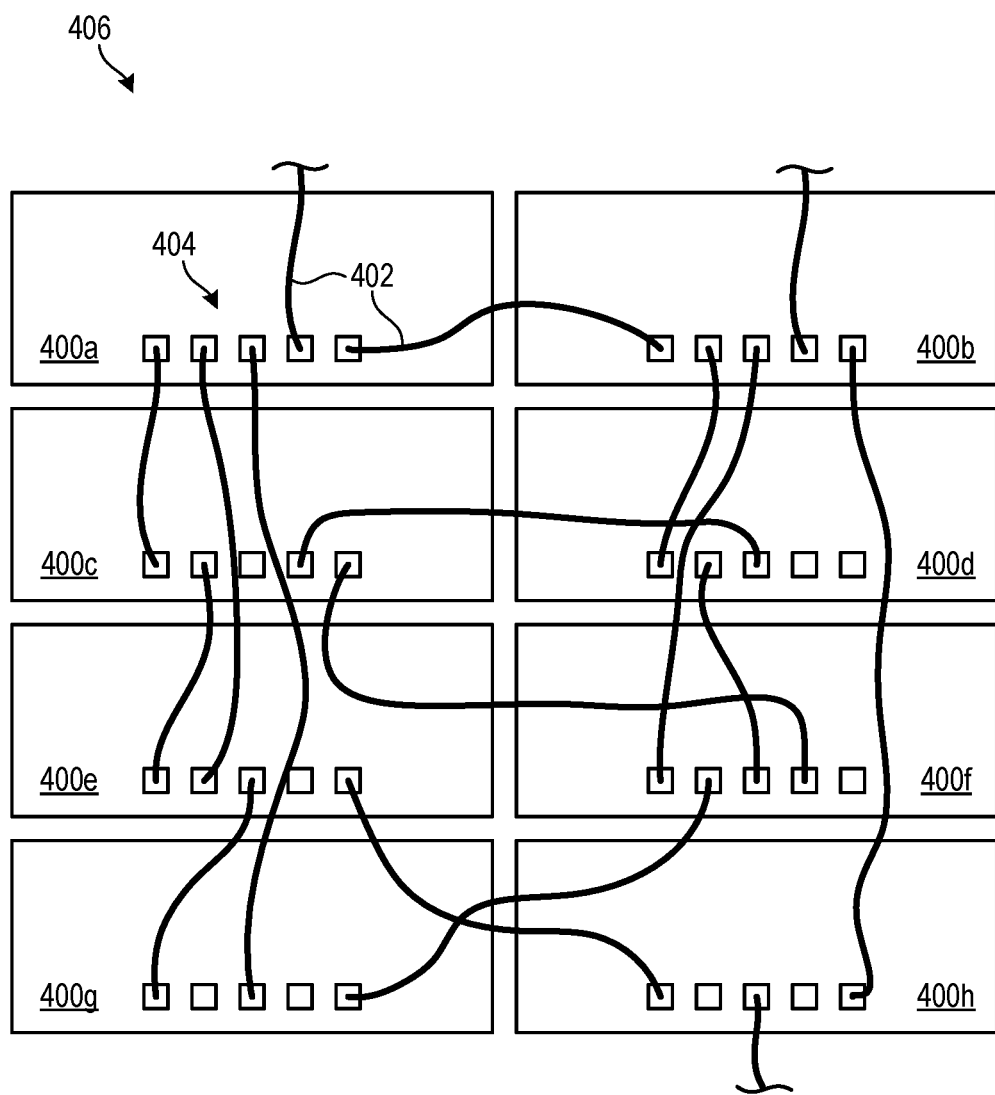
FIG. 4 is a high-level block diagram showing various components connected together using cables and ports.

Referring to FIG. 4, with complex systems 406 that include a large number of components 400, the number of cables 402 and ports 404 may be significant. FIG. 4 is a high-level block diagram showing an exemplary system 406 made up of various components 400 connected together using cables 402 and ports 404. The larger number of components 400 in such a system 406, the higher probability that components 400 will fail and/or need to be replaced or serviced at some time in the future. When components 400 in a complex system 406 are connected together with cables 402 at the time they are initially set up or when a component is replaced, there is a significant chance that the complex system 406 will be connected together incorrectly. Incorrectly connected cables 402 are typically not easily identified and may lead to a crisis or failure at some future point in time. Furthermore, trying to diagnose and remedy incorrectly connected cables 402 may consume a significant amount of time and resources and therefore result in significant costs.

Figure 5:
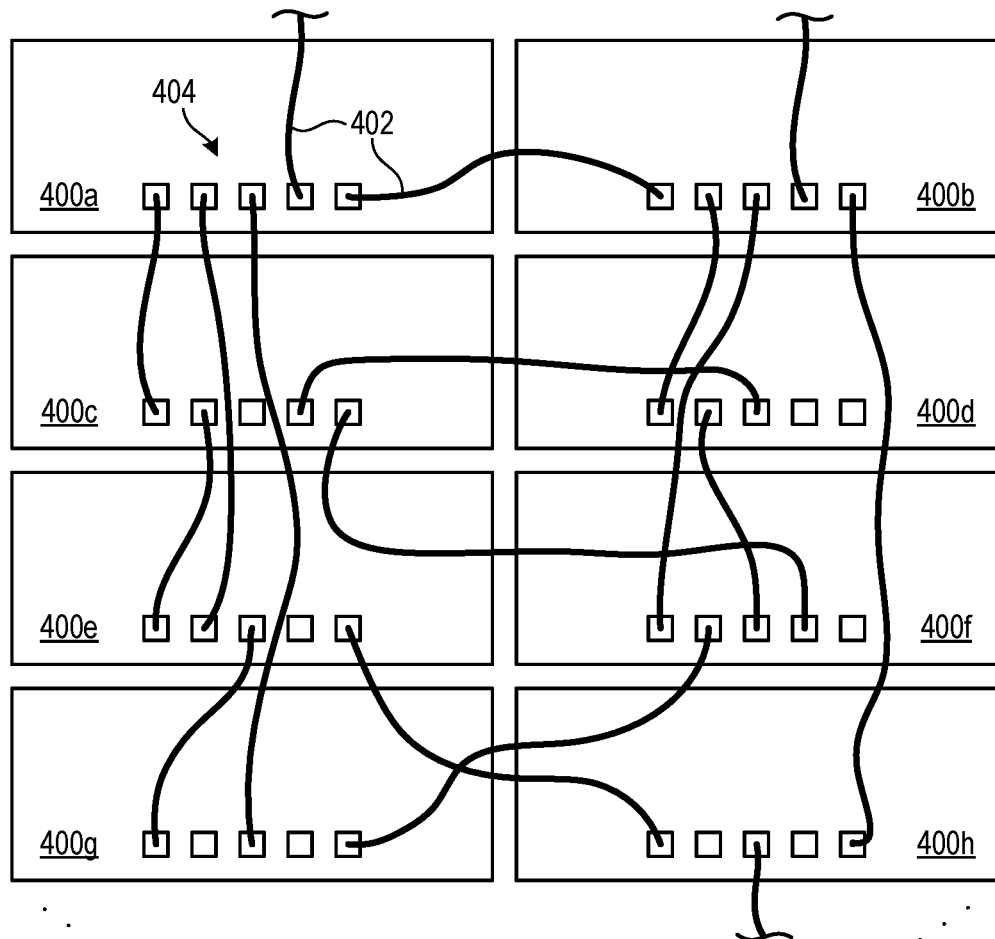
FIG. 5 is a high-level block diagram showing a handheld device used to capture a visual image of the components, cables, and ports.
Figure 5:
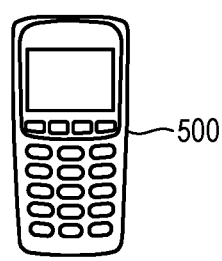

Referring to FIG. 5, in certain embodiments, an apparatus and method may be provided to ensure that components 400 in a complex system 406 are correctly connected together. Such an apparatus and method will ideally significantly reduce human error when connecting the components 400 together.

In certain embodiments, an apparatus 500, such as a handheld device 500, may be provided to ensure that components 400 in a system 406 are correctly connected together. In certain embodiments, once a user connects the components 400 together with cables 402 and ports 404 (during, for example, initial setup of the system 406 or after a repair or replacement of components 400 within the system 406), the apparatus 500 may be configured to capture a visual image of the system 406. In certain embodiments, the apparatus 500 may include a camera and capturing the visual image may be as simple as taking a picture of the system 406 with the apparatus 500 at an angle where the ports 404 and cables 402 are visible.

This visual image may then be analyzed to determine the connection between components 400. For example, artificial intelligence may be used to analyze the visual image and determine one or more of the components 400 that are being utilized, the ports 404 on the components 400 that are being utilized, and the routing of cables 402 between the ports 404. For example, the artificial intelligence may include functionality to identify, within the visual image, cables 402 that are being utilized and trace the routing of these cables 402 from one port 404 to another. The artificial intelligence may be implemented on the apparatus 500 itself and/or on a server that is remote from or external to the apparatus 500 and which communicates with and exchanges information with the apparatus 500. For the purposes of this disclosure, the apparatus 500 may, in certain embodiments, be deemed to include the apparatus 500 itself and any remote or external functionality that is utilized by the apparatus 500.

Once the connections between the components 400 are determined, the apparatus 500 may generate a model that represents the components 400 and the connections therebetween. This model may be presented in any suitable format, including a block diagram or other structured representation. Among other information, the model may identify the components 400 that are being utilized, which ports 404 of the components 400 are being utilized, the types of ports 404 that are being utilized, and the cables 402 and connectivity between the ports 404.

Once the model is generated, the apparatus 500 may compare the model to a previous model to determine if any connections are incorrect or potentially incorrect. In essence, the apparatus 500 validates the current model against a previous model. The previous model may be a former good configuration of the system 406, or potentially a default or ideal system 406. For example, the previous model may be generated from an image captured of the system 406 prior to making any repairs and/or replacements. Alternatively, the previous model may be retrieved from a local or centralized repository. Such a repository may contain, for example, models of systems that are known to have good or efficient configurations and therefore provide a basis from which to compare or validate the system 406.

If any differences between the current model and the previous model are identified, this may indicate that the components 400 have been connected together incorrectly. In certain embodiments, the apparatus 500 may be configured to notify a user in the event any differences are found as well as identify what the differences are. In certain embodiments, the apparatus 500 may suggest how to correct connections and/or suggest alternate connections that may improve or optimize the connectivity of the system 406.

Figure 6:
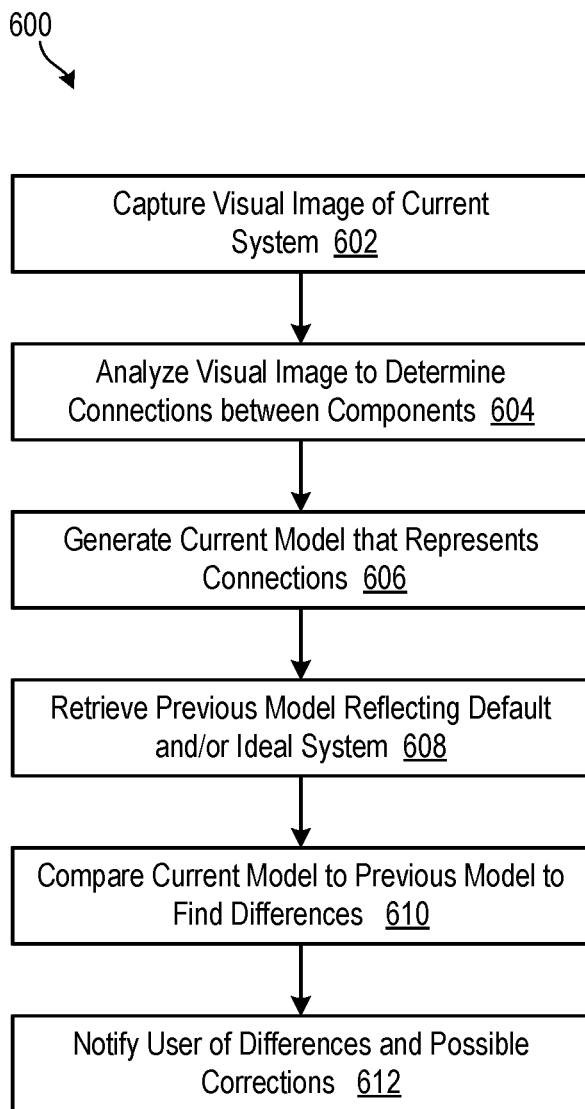
FIG. 6 is a flow diagram showing a first exemplary method for ensuring that components in a complex system are correctly connected together.

Referring to FIG. 6, one embodiment of a method 600 for ensuring that components 400 in a complex system 406 are correctly connected together is illustrated. In certain embodiments, this method 600 is executed by the apparatus 500 previously discussed. In the illustrated embodiment, the method 600 initially captures 602 a visual image of a current system 406. In certain embodiments, this current system 406 is one that has just been set up. The method 600 then analyzes 604 the visual image to determine the connections between components 400. This analysis may include identifying the components 400 themselves (e.g., types, functions, model numbers of the components 400), identifying the ports 404 that are utilized on the components 400, identifying the cables 402 that are utilized between the components 400, and/or identifying the routing of the cables 402 between the ports 404 of the components 400.

The method 600 then generates 606 a current model that reflects the current connectivity state of the system 406. The method 600 also retrieves 608 a previous model that reflects a default or ideal system. This default or ideal system may reflect a default or ideal connectivity between components 400 in the system. In certain embodiments, the default or ideal system may be determined by evaluating one or more models or configurations (either of existing or proposed systems) added to a central repository and using that information along with machine learning to determine an optimized configuration for the system. The method 600 compares 610 the current model to the previous model to determine if any differences exist. If differences do exist, this may indicate the presence of incorrect or non-optimal connections in the current system 406. The method 600 may then notify 612 a user of these differences and/or provide 612 suggestions to correct the connections.

Figure 7:
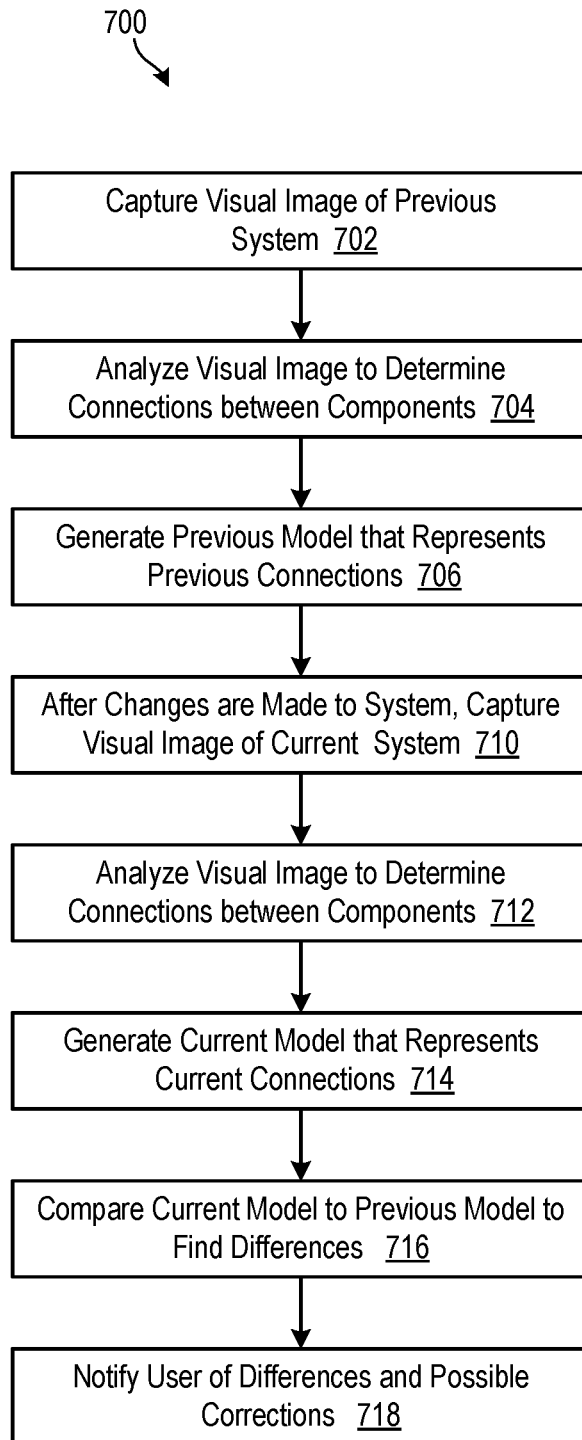
FIG. 7 is a flow diagram showing a second exemplary method for ensuring that components in a complex system are correctly connected together.

Referring to FIG. 7, another embodiment of a method 700 for ensuring that components 400 in a complex system 406 are correctly connected together is illustrated. In certain embodiments, this method 700 is executed by the apparatus 500 previously discussed In this embodiment, the method 700 captures 702 a visual image of a previous system 406 (i.e., a system 406 before repairs and/or changes are made). The method 700 then analyzes 704 the visual image to determine the connectivity between components 400 prior to the repairs and/or changes. The method 700 generates 706 a previous model that represents the connections between components 400 of the previous system 406.

After changes (i.e., repairs and/or replacements) have been made to the system 406, the method 700 captures 710 a visual image of the current system 406. The method 700 analyzes 712 the visual image to determine the connectivity between components 400. The method 700 then generates 714 a current model that represents the connectivity of the system 406 after the changes have been made.

At this point, the method 700 compares 716 the current model to the previous model to determine if any differences exist. In essence, this step 716 validates the current model against the previous model to determine if the current system 406 is connected in the same manner as the previous system 406. If not, the method 700 notifies 718 a user of the differences and/or possible corrections to be made to bring the connectivity of the current system 406 into conformity with the connectivity of the previous system 406.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to ensure that components in a complex system are correctly connected together, the method comprising:
obtaining a visual image of a system captured using a camera, the system comprising a plurality of components connected together with cables;
analyzing, using artificial-intelligence-based image recognition, the visual image to trace the routing of cables between ports of the components in order to determine connections between the components;
building a current model that represents the connections between the components;

comparing the current model to a previous model to find differences between the current model and the previous model; and notifying a user of the differences.

2. The method of claim 1, wherein the previous model reflects a connective state of the system prior to the current model.

3. The method of claim 1, wherein the previous model reflects a connective state of a default or ideal system.

4. The method of claim 1, wherein analyzing the visual image comprises identifying types of the cables that are utilized between the components.

5. The method of claim 1, wherein analyzing the visual image comprises identifying types of the ports that are utilized on the components.

6. The method of claim 1, wherein analyzing the visual image comprises identifying the components.

7. The method of claim 1, wherein notifying the user comprises notifying the user of incorrect connections between the components.

8. A computer program product to ensure that components in a complex system are correctly connected together, the computer program product comprising a computer-readable storage medium having computer-usable program code embodied therein, the computer-usable program code configured to perform the following when executed by at least one processor:

obtain a visual image of a system captured using a camera, the system comprising a plurality of components connected together with cables;

analyze, using artificial-intelligence-based image recognition, the visual image to trace the routing of cables between ports of the components in order to determine connections between the components;

build a current model that represents the connections between the components;

compare the current model to a previous model to find differences between the current model and the previous model; and notify a user of the differences.

9. The computer program product of claim 8, wherein the previous model reflects a connective state of the system prior to the current model.

10. The computer program product of claim 8, wherein the previous model reflects a connective state of a default or ideal system.

11. The computer program product of claim 8, wherein analyzing the visual image comprises identifying types of the cables that are utilized between the components.

12. The computer program product of claim 8, wherein analyzing the visual image comprises identifying types of the ports that are utilized on the components.

13. The computer program product of claim 8, wherein analyzing the visual image comprises identifying the components.

14. The computer program product of claim 8, wherein notifying the user comprises notifying the user of incorrect connections between the components.

15. An apparatus to ensure that components in a complex system are correctly connected together, the apparatus comprising:

at least one processor;

at least one memory device coupled to the at least one processor and storing instructions for execution on the at least one processor, the instructions causing the at least one processor to:

obtain a visual image of a system captured using a camera, the system comprising a plurality of components connected together with cables;

analyze, using artificial-intelligence-based image recognition, the visual image to trace the routing of cables between ports of the components in order to determine connections between the components;

build a current model that represents the connections between the components;

compare the current model to a previous model to find differences between the current model and the previous model; and notify a user of the differences.

16. The apparatus of claim 15, wherein the previous model reflects a connective state of the system prior to the current model.

17. The apparatus of claim 15, wherein the previous model reflects a connective state of a default or ideal system.

18. The apparatus of claim 15, wherein analyzing the visual image comprises identifying types of the cables that are utilized between the components.

19. The apparatus of claim 15, wherein analyzing the visual image comprises identifying types of the ports that are utilized on the components.

20. The apparatus of claim 15, wherein notifying the user comprises notifying the user of incorrect connections between the components.

* * * * *